Dec. 8, 1936.     C. R. SPEARIN     2,063,766
SAW HANDLE
Filed July 2, 1935
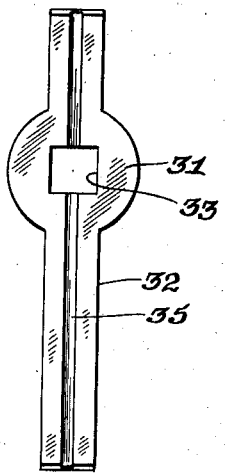
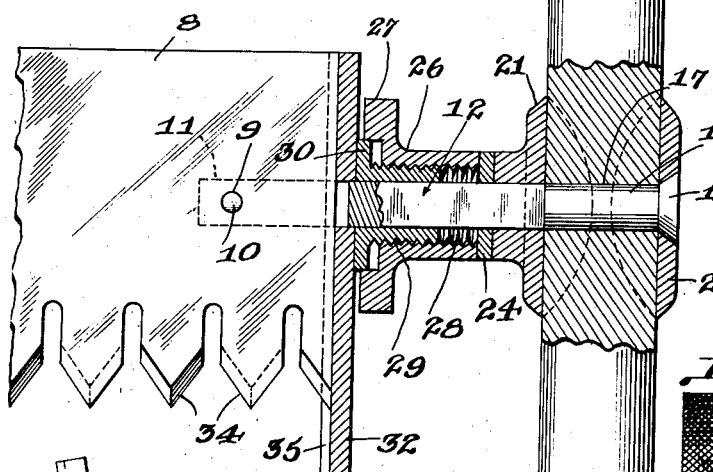
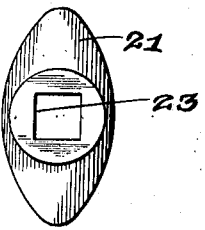
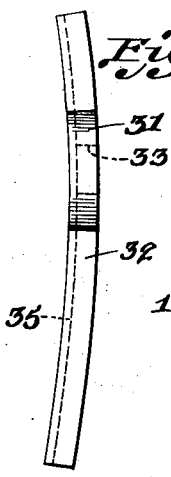
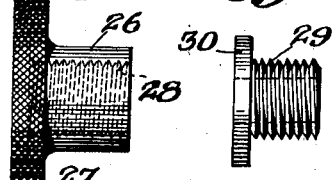
Inventor
Chester R. Spearin
By Seymour + Bright
Attorneys Patented Dec. 8, 1936

2,063,766

UNITED STATES PATENT OFFICE 2,063,766

SAW HANDLE

Chester R. Spearin, Bellingham, Wash.

Application July 2, 1935, Serial No. 29,559

2 Claims. (Cl. 145—111)

This invention relates to improvements in means for securing a saw handle to a saw blade and more particularly to novel means for securely connecting handles to the ends of crosscut saws.

The primary object of the invention is to provide saw handle securing means that may be readily applied and which when once tightened, will stay tight and hold the parts in rigid relation relatively to one another.

With the foregoing and other objects in view which will appear as the description proceeds, the invention consists in the novel features hereinafter described in detail, illustrated in the accompanying drawing and more particularly pointed out in the appended claims.

In the drawing:

Fig. 1 is an end elevation of a saw blade provided with my improvements, some of the elements of the improvements being shown in vertical section.

Fig. 2 is an elevation of an improved saw guard forming part of the invention.

Fig. 2a is a side edge view of the guard.

Fig. 3 is a plan view partly in vertical section of the pin or rod forming part of my construction.

Fig. 4 is an elevation of the inner handle clamp plate of my device.

Fig. 5 is a side elevation of a hand-operated nut forming a unit of the device.

Fig. 6 is a similar view of an inner nut which cooperates with the first mentioned nut.

Fig. 7 is an elevation of a wear washer forming part of the construction.

Referring to the drawing, 8 is a saw blade provided at each end with a hole 9 to receive a rivet 10 that secures the blade to the forked shaped portion 11 of a pin or bolt 12.

From Fig. 3 it will be noted that the hole in the bolt which receives the rivet has a restricted portion 13 positioned at one side of the slit 14 of the bolt so as to prevent the loss of the rivet from the bolt even though the end 15 of the rivet should work loose and pass through the hole in the saw blade.

A saw handle 16 of conventional shape is provided with an aperture 17 to receive a portion of the shank of the bolt and this portion may be of cylindrical shape as shown at 18.

The head 19 of the bolt is countersunk in an outer clamp plate 20, engaging one side of the handle, and this plate cooperates with an inner clamp plate 21 to rigidly hold the handle 16 in place.

The major portion of the shank of the bolt is of polygonal or square shape cross section as shown at 22 and the inner clamp plate has a similarly shaped aperture 23 to receive the square portion of the shank. Obviously this will prevent the member 21 from turning on the bolt, but will permit the handle to be arranged at right angles to the blade instead of in alignment therewith, if desired.

A washer 24 preferably made of brass or the like is also arranged on the bolt and it has a square aperture 25 to prevent turning of the washer.

The washer cooperates with the clamp plate 21 and also with a hand-operated nut 26 having a knurled wheel 27 and internal screw threads 28. These screw threads engage the external screw threads of an inner nut 29 which has a square aperture to accommodate the square portion of the bolt. The nut 29 also has a head 30 that abuts against the enlarged portion 31 of a saw guard 32. The latter has a square aperture 33 to accommodate the bolt and it is positioned between an end of the blade and the head 30. Consequently, it will act to prevent the fingers of the operator from coming in contact with the teeth 34 of the blade and will also function as a gauge to limit the stroke of the saw.

A groove 35 is preferably provided in one face of the guard and extends lengthwise of the latter so as to receive the end of the saw blade, and I prefer to make this guard of bow shape lengthwise and of resilient material as shown in Fig. 2a. Consequently when the nut 26 is turned in the proper direction it will cause the head of the nut 29 to impinge against the medial portion of the guard with the result that the guard will straighten out but due to its resiliency, it will always act to frictionally hold the nut 29 in a certain position. Of course, when the nut 26 is turned in the last mentioned direction one of its ends will bear against the washer 24 and this will result in forcing the plate 21 toward the plate 20 so as to securely clamp the handle in place.

Obviously the parts can be readily dismantled by first removing the rivet 10.

From the foregoing it is believed that the construction and advantages of the device may be readily understood and it is obvious that changes may be made in the details disclosed without departing from the spirit of the invention as expressed in the claims.

What I claim and desire to secure by Letters Patent is:

1. In a structure of the character described, a saw blade, a handle, a bolt extending through the handle and secured to the blade, inner and outer clamping plates mounted on the bolt and arranged at opposite sides of the handle for clamping the handle to the bolt, a washer mounted on the bolt and engaging the inner clamping plate, a saw guard mounted on the bolt and having a groove to receive one end of the saw blade, an inner nut slidably mounted on the bolt and impinging against the guard, an outer hand-operated nut having threaded engagement with the inner nut and impinging against said washer, the inner clamping plate, guard and inner nut being slidably arranged on the bolt but being prevented from rotating on the latter due to the shape of the cross section of the bolt upon which these parts are mounted.

2. The combination with a saw blade and a handle, of a bolt having a portion of polygonal cross section connecting the blade and handle, a guard mounted on the bolt and engaging an end of the saw blade, clamping plates mounted on the bolt and engaging the handle, and oppositely movable members mounted on the bolt and threadedly engaging one another for simultaneously moving the guard toward the blade and one of the clamping plates toward the handle, one of said threaded members being manually operated, said guard having an aperture conforming to the polygonal cross section portion of the bolt to prevent turning of the guard on the bolt, said guard being formed of resilient material and of normally bow shape lengthwise thereof but being held in straight condition by the clamping action of one of said threaded members and an end of the saw blade.

CHESTER R. SPEARIN.